United States Patent [19]

Mitsumoto et al.

[11] Patent Number: 5,457,462
[45] Date of Patent: Oct. 10, 1995

[54] RADAR SIGNAL PROCESSOR AND PULSE DOPPLER RADAR SYSTEM THEREWITH

[75] Inventors: Masashi Mitsumoto; Takahiko Sugimoto; Takahiko Fujisaka; Michimasa Kondo, all of Kamakura, Japan

[73] Assignee: Mitsubishi Denki Kabushiki Kaisha, Tokyo, Japan

[21] Appl. No.: 279,941

[22] Filed: Jul. 25, 1994

[30] Foreign Application Priority Data

Jul. 28, 1993 [JP] Japan ................... 5-186383

[51] Int. Cl.$^6$ ................ G01S 7/288; G01S 7/292
[52] U.S. Cl. ............... 342/93; 342/194; 342/99
[58] Field of Search ................ 342/93, 194, 94, 342/95, 98, 99, 135, 136

[56] References Cited

U.S. PATENT DOCUMENTS

| | | | |
|---|---|---|---|
| 3,968,490 | 7/1976 | Gostin | 342/93 |
| 4,053,885 | 10/1977 | Tomita et al. | 342/162 |
| 4,079,376 | 3/1978 | Kirk, Jr. | 342/93 |
| 4,231,005 | 10/1980 | Taylor, Jr. | 342/194 |
| 4,242,682 | 12/1980 | Musha et al. | 342/93 |
| 4,401,987 | 8/1983 | Cyr | 342/93 |
| 4,459,592 | 7/1984 | Long | 342/93 |
| 4,713,664 | 12/1987 | Taylor, Jr. | 342/91 |
| 5,115,244 | 5/1992 | Freedman et al. | 342/158 |
| 5,132,688 | 7/1992 | Mitsubishi . | |
| 5,191,347 | 3/1993 | Mitsubishi . | |

FOREIGN PATENT DOCUMENTS 4-5033  2/1992  Japan .

OTHER PUBLICATIONS

"Modern Radar System Analysis" David K. Barton.

Primary Examiner—John B. Sotomayor
Attorney, Agent, or Firm—Wolf, Greenfield & Sacks

[57] ABSTRACT

A radar signal processor for use in a pulse radar system. Reception signals are given from a range divide and output circuit to a plurality of integration point variable coherent integrators, each of which is allocated to a different range domain. The range domain is given to an integration point setting section provided corresponding to each integration point variable coherent integrator. The integration point setting section determines the number of coherent integration points based on the given range domain and sets it in the corresponding integration point variable coherent integrator. The signal resulting from coherent integration by the integration point variable coherent integrator is discriminated to frequencies, then supplied to any square detector for square detection for each frequency component. Square detection output is fed into a CFAR detector, which then makes its false alarm rate constant for a supply to a display, etc.

15 Claims, 11 Drawing Sheets

RADAR SIGNAL PROCESSOR AND PULSE DOPPLER RADAR SYSTEM THEREWITH

BACKGROUND OF THE INVENTION

1. Field of the Invention

This invention relates to a radar signal processor having a coherent integration (also called predetection integration) function and a pulse Doppler radar system using the processor.

2. Description of the Related Art

FIGS. 11 and 12 show the configuration of a radar system disclosed in Japanese Utility Model Publication No.Hei 4-5033. The radar system is a pulse radar system which transmits a pulse signal and receives its echo for searching for surrounding targets; it is also a Doppler radar system which can detect a Doppler frequency component contained in the received echo for detecting moving targets. Such a configuration is called a pulse Doppler radar system.

As shown in FIG. 11, an antenna 1 is shared by transmitting and receiving circuits. A transmitting pulse generator 3 generates a transmitting pulse in response to a control signal, such as a signal indicating a pulse repetition frequency or pulse width, supplied from a reference generator 5, and supplies a radio frequency signal of a predetermined frequency modulated by the transmitting pulse via a diplexer 2 to the antenna 1. When receiving the signal from the transmit pulse generator 3, the antenna 1 transmits it to surrounding space, hereinafter referred to as search space, as a radio wave. If a target exists in the search space, the radio wave transmitted through the antenna 1 is reflected by the target. The echo is received by the antenna 1 and is supplied via the diplexer 2 to a frequency converter 4, which then converts the input echo into a predetermined intermediate frequency and further amplifies the resultant intermediate frequency signal.

The intermediate frequency signal amplified by the frequency converter 4 is phase-detected by an in-phase synchronous detector 6I and a quadrature-phase synchronous detector 6Q. The reference phase required for the quadrature-phase detection is given as a reference signal from the reference generator 5. That is, the in-phase synchronous detector 6I detects the intermediate frequency signal in synchronization with the phase of the reference signal (reference phase) and the quadrature-phase synchronous detector 6Q detects the intermediate frequency signal in synchronization with the phase orthogonal to the reference phase. The in-phase component I provided from the in-phase synchronous detector 6I by such an operation is converted from analog into digital form by an A/D converter 7I; the quadrature-phase component Q provided from the quadrature-phase synchronous detector 6Q is converted from analog into digital form by an A/D converter 7Q. Hereinafter, the in-phase component I and quadrature-phase component Q are collectively called a complex signal.

As methods of improving the signal to noise power ratio (SN) of the signal thus obtained, for example, coherent integration, incoherent integration, also called postdetection integration, CFAR (constant false alarm rate) processing, and the like are available. SN improvement sections 9-1, 9-2, ... 9-L shown in FIG. 11 are circuitry for executing such processing. L SN improvement sections 9-1, 9-2, ... 9-L (L: A natural number of 2 or greater, for example, 100) are provided as shown in FIG. 11, each of which takes a predetermined range domain. For example, the SN improvement section 9-1 takes a range domain R(1), the SN improvement section 9-2 takes a range domain R(2), ... the SN improvement section 9-L takes a range domain R(L). The range mentioned here corresponds to the time from transmission of a radio wave to reception of the echo thereof and the range domain means a domain to which one reception point of time, namely, a point at one range from the transmission point belongs. Allocation of the range domains to the SN improvement sections is fixed.

A range divide circuit 8 divides a complex signal into L parts according to the range, namely, components corresponding to range domains in such a manner that it supplies the part of the complex signal in the range domain R(1) taken by the SN improvement section 9-1 to the same, the part in the range domain R(2) to the SN improvement section 9-2, ... the part in the range domain R(L) to the SN improvement section 9-L. Thus, the range divide circuit 8 inputs transmitting pulses from the transmitting pulse generator 3 to know the transmission timings. The SN improvement sections 9-1, 9-2, ... 9-L perform processing (described below) for the supplied complex signal parts, and supply the resultant signals to a display 10, which then converts the signals into a radar image for display on a screen thereof. For example, it displays a moving target.

The SN improvement section 9-i (i=1, 2, ... L) comprises a coherent integrator 11, square detectors 12-1, 12-2, ... 12N, and a CFAR detector 13, as shown in FIG. 12. The coherent integrator 11 coherently integrates the parts of the divided complex signal supplied from the range dividing circuit 8 for improving the SN. Generally, more than one echo (echo pulse) is obtained from a single target. Assuming that the number of echo pulses obtained from a single target is N (N: A natural number of 2 or greater), the SN can be improved N times by performing conventionally known coherent integration. This means that the target signal to noise power ratio containing white noise generated by the frequency converter 4, the in-phase synchronous detector 6I, the quadrature-phase synchronous detector 6Q, etc., can be improved. Since one range domain R(1) is allocated to the SN improvement section 9-i as described above, the coherent integration performed by the coherent integrator 11 enables a target positioned in the range domain R(1) to be detected at SN as many times as the number of coherent integration points, namely, N times that in the case where no coherent integration is performed. The coherent integrator 11 discriminates the coherent integration result to N Doppler frequency components for output.

Each Doppler frequency component output from the coherent integrator 11 (represented as complex signal in the figure) is input to any of the square detectors 12-1, 12-2, ... 12-N. Each square detector makes square detection of the input complex signal and outputs the result to the CFAR detector 13, which then compares the square detection output with a threshold to remove noise generated, for example, by clutter. The threshold is defined in response to the square detection output value.

Assume that one of the N square detection outputs arranged along the Doppler frequency axis is observed. The threshold used for comparison with the square detection output value corresponding to the observed Doppler frequency component, namely, object Doppler frequency component, is the average value or weighted average value of a total of M (M: A natural number of 2 or greater) square detection output values corresponding to a total of M Doppler frequency components before and after the object Doppler frequency component, namely, reference Doppler frequency components. The CFAR detector 13 compares each square detection output value with the threshold found as described above. For example, the square detection output values equal to or greater than the threshold value are converted into "1"; other values, "0."

The rate at which noise such as clutter is erroneously recognized as a target, the false alarm rate, can be made constant by performing such threshold comparison and conversion processing. Since noise generated by clutter, etc. is wide compared with a target, the noise level is reflected in the average value or weighted average value of the square detection output values and a change in the noise level is also reflected in the average value or weighted average value of the square detection output values. Therefore, the average value or weighted average value of the square detection output values of the M reference Doppler frequency components before and after the object Doppler frequency component is found for use as the threshold, whereby the false alarm rate can be made constant regardless of the occurrence of noise or its tendency. The conversion result is supplied to the display 10.

Setting the number of coherent integration points, N, introduces a problem in such a conventional radar system. If the number of coherent integration points, N, is made large, generally the number of echo pulses that can be integrated increases, so that improved performance of the SN of the coherent integrator 11 results. In contrast, if the number of coherent integration points, N, is made large, it will take time for coherent integration; resultantly, the time from reception of echo to target detection, namely, the observation time is prolonged. If the observation time is prolonged, rapid detection of the target is made impossible, delaying taking steps for a near range target, such as a moving target existing in a near range, for which steps should be taken as promptly as possible after detection. If the number of coherent integration points, N, is made small, the observation time can be shortened to take instant steps for a near range target, but the SN improvement effect by the coherent integration cannot be expected to be very much.

Hitherto, the number of coherent integration points, N, has been set to a comparatively large value considering such a disadvantage. That is, the number of coherent integration points, N, has been set in response to the maximum range (maximum detection range) in which the minimum target having a predetermined size can be detected, and the problem of immediate response such as early detection of near range targets remains unsolved.

SUMMARY OF THE INVENTION

It is therefore a first object of the invention to improve the SN of far range targets by coherent integration and to shorten the observation time of near range targets at the same time. It is a second object of the invention to raise the SN improvement degree for near ranges and moreover to improve the detection capability of near range targets. It is a third object of the invention to set a CFAR threshold for a far range to a proper value and moreover to improve the detection capability of far range targets. It is a fourth object of the invention to improve a detection rate of near range targets in processing at the following stage of CFAR detection. It is a fifth object of the invention to lower a cumulative false alarm rate by controlling the CFAR threshold. It is a sixth object of the invention to furthermore improve the SN by postdetection integration and also to improve flexibility when the system configuration is designed.

To these ends, according to a first aspect of the invention, there is provided a radar signal processor for use in a pulse radar system, comprising:

A) a plurality of means for improving SN by integration, each having predetection integration means for integrating a divided reception signal over a setup number of integration points, a different range being allocated to each of the plurality of SN improvement means;

B) range division means for dividing the reception signal on the basis of a range from a transmission point and for distributing the divided reception signal to the predetection integration means belonging to the corresponding SN improvement means in response to the range allocated to each of the plurality of SN improvement means; and C) integration point setting means for setting the number of divided reception signals to be integrated by each predetection integration means in the corresponding predetection integration means as the number of integration points, the integration point setting means determining the number of integration points in response to a range so that SN is improved by the integration in more than a predetermined degree with respect to every range and that the improvement degree of the SN in a near range is more than that in a far range.

In this first aspect, a reception signal is divided on the basis of the range from a transmission point and distributed to the SN improvement means, specifically, the predetection integration means, allocated to the corresponding range. The predetection integration means integrates reception signals over a setup number of integration points and improves the SN by the integration. The number of integration points is set for the predetection integration means so that SN is improved by the integration in more than a predetermined degree with respect to every range and that the improvement degree of the SN in a near range is more than that in a far range. Therefore, in the invention, while good SN is obtained for far and near range targets, the integration time for a near range target is shortened and the observation time becomes short, leading to improved responsiveness. Further, the number of integration points can also be set so that the degree of SN improvement in a near range exceeds that in a far range.

To apply the invention to a pulse Doppler radar system, the following configuration is provided: In a radar signal processor according to a second aspect of the invention, each of the predetection integration means in the first aspect discriminates the integrated reception signal to a plurality of frequency components, and each of the SN improvement means in the first aspect further includes a plurality of detection means for inputting corresponding frequency components of the plurality of frequency components resulting from the discriminating from the predetection integration means belonging to the same SN improvement means and detecting the input frequency components, and a plurality of false alarm rate fixing means responsive to the detected frequency components for generating a detection signal representing existence and speed of a target from which signal a constant false alarm rate can be expected, the false alarm rate fixing means each corresponding to any of the detection means and having means for finding an average value or weighted average value of reference frequency components for each object frequency component, means responsive to the found average value or weighted average value for setting a threshold for the object frequency component, and means for comparing the threshold set for each object frequency component with the corresponding object frequency component and totaling results for generating the detection signal. Here, the object frequency component refers to each of the detected frequency components and the reference frequency components refer to a predetermined number of frequency components preceding and following the object frequency component along a frequency axis.

In such a configuration, further, if the number of reference frequency components used as a basis to find the average value or weighted average value is set so that the greater the number of integration points set in the predetection integration means belonging to the same SN improvement means, the greater the number of reference frequency components, detection precision particularly for far range targets improves.

If a logical operation is performed on a predetermined number of detection signals generated by the false alarm rate fixing means belonging to the same SN improvement means for totaling the detection signals, and the resultant total detection signal is output instead of the detection signals, the detection rate for near range targets improves. In this case, further, in response to the number of detection signals totaled in the logical operation means belonging to the same SN improvement means, a threshold set by the false alarm rate fixing means belonging to the same SN improvement means can also be adjusted so that a false alarm rate of the total detection signal output from the logical operation means is suppressed.

In addition, if detected frequency components are input from the corresponding one of the detection means belonging to the same SN improvement means, a predetermined number of the frequency components are integrated, and the integration result is supplied to the false alarm rate fixing means belonging to the same SN improvement means, the SN furthermore improves and the detection capability raises. The postdetection integration described above can also be combined with totalization by the logical operations.

According to a third aspect of the invention, there is provided a method of improving SN in a pulse Doppler radar system, comprising the steps of:

A) dividing a reception signal on the basis of a range from a transmission point;

B) setting the number of integration points on the basis of a range from a transmission point so that SN is improved by predetection integration in more than a predetermined degree with respect to every range and that the improvement degree of the SN in a near range is more than that in a far range; and C) integrating the divided reception signal before detection for each range over a predetermined number of integration points.

In this aspect, similar advantages to those in the first aspect are also produced.

According to a fourth aspect of the invention, there is provided a method of improving a detection capability in a pulse Doppler radar system, comprising the steps of:

A) dividing a reception signal on the basis of a range from a transmission point;

B) setting the number of integration points on the basis of a range from a transmission point so that SN is improved by predetection integration to more than a predetermined degree with respect to every range and that the improvement degree of the SN in a near range is more than that in a far range;

C) integrating the divided reception signal before detection for each range over a predetermined number of integration points.

D) discriminating the reception signal integrated before detection to a plurality of frequency components;

E) detecting the frequency components resulting from the discriminating;

F) defining each of the detected frequency components related to the same range, as an object frequency component and a predetermined number of frequency components related to the same range preceding and following the object frequency component along a frequency axis as reference frequency components and finding an average value or weighted average value of the reference frequency components for each object frequency component;

G) setting a threshold for the object frequency component based on the found average value or weighted average value;

H) comparing the threshold set for each object frequency component with the corresponding object frequency component and totaling the results for generating a detection signal representing existence and speed of a target from which signal a constant false alarm rate can be expected; and I) setting the number of reference frequency components used as a basis to find the average value or weighted average value so that the greater the number of integration points related to the same range, the greater the number of reference frequency components.

In this aspect, similar advantages to those in the first and second aspects are produced.

DESCRIPTION OF THE PREFERRED EMBODIMENTS

Referring now to the accompanying drawings, there are shown preferred embodiments of the invention.

Figure 10:
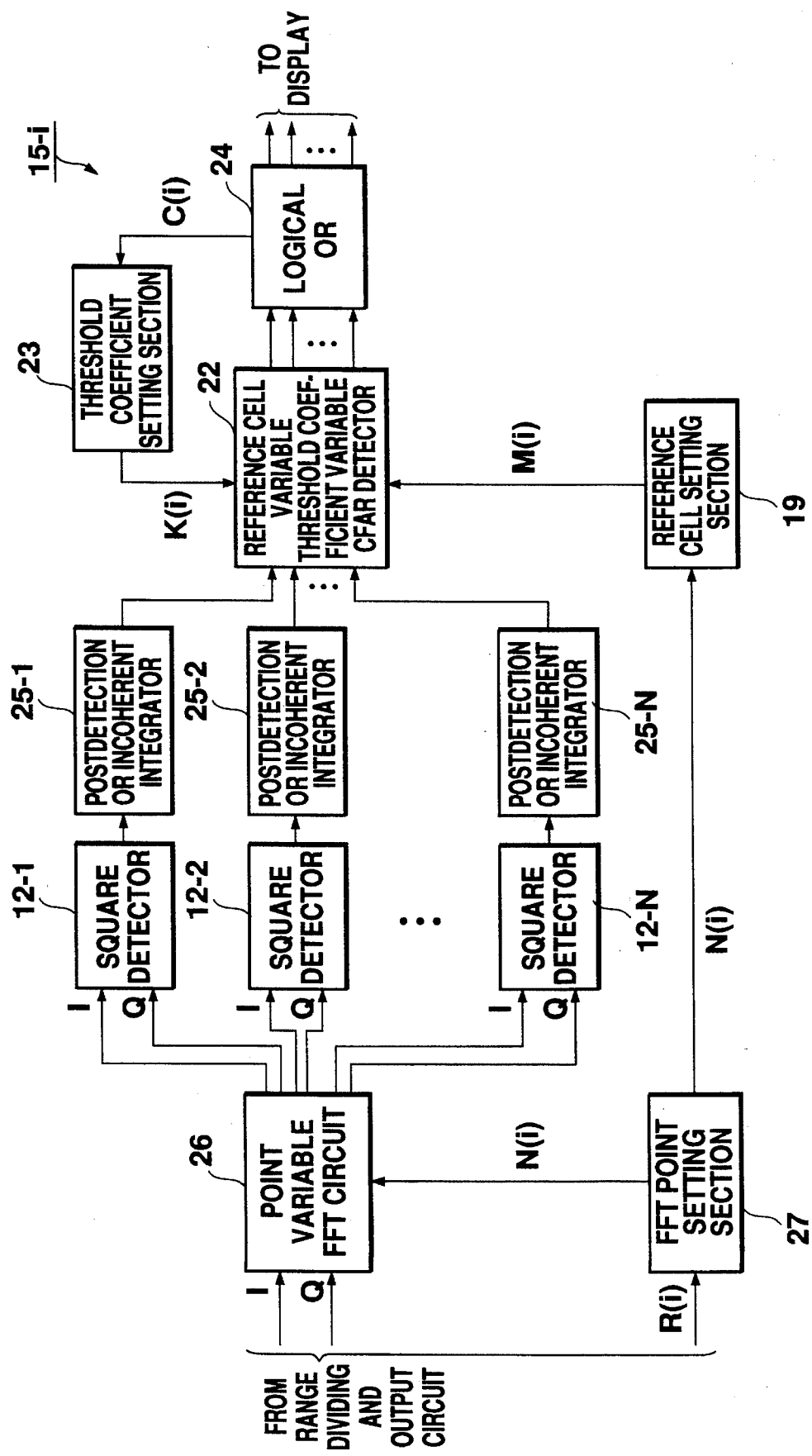
FIG. 10 is a block diagram showing the configuration of a main section of a sixth embodiment of the invention.
Figure 11:
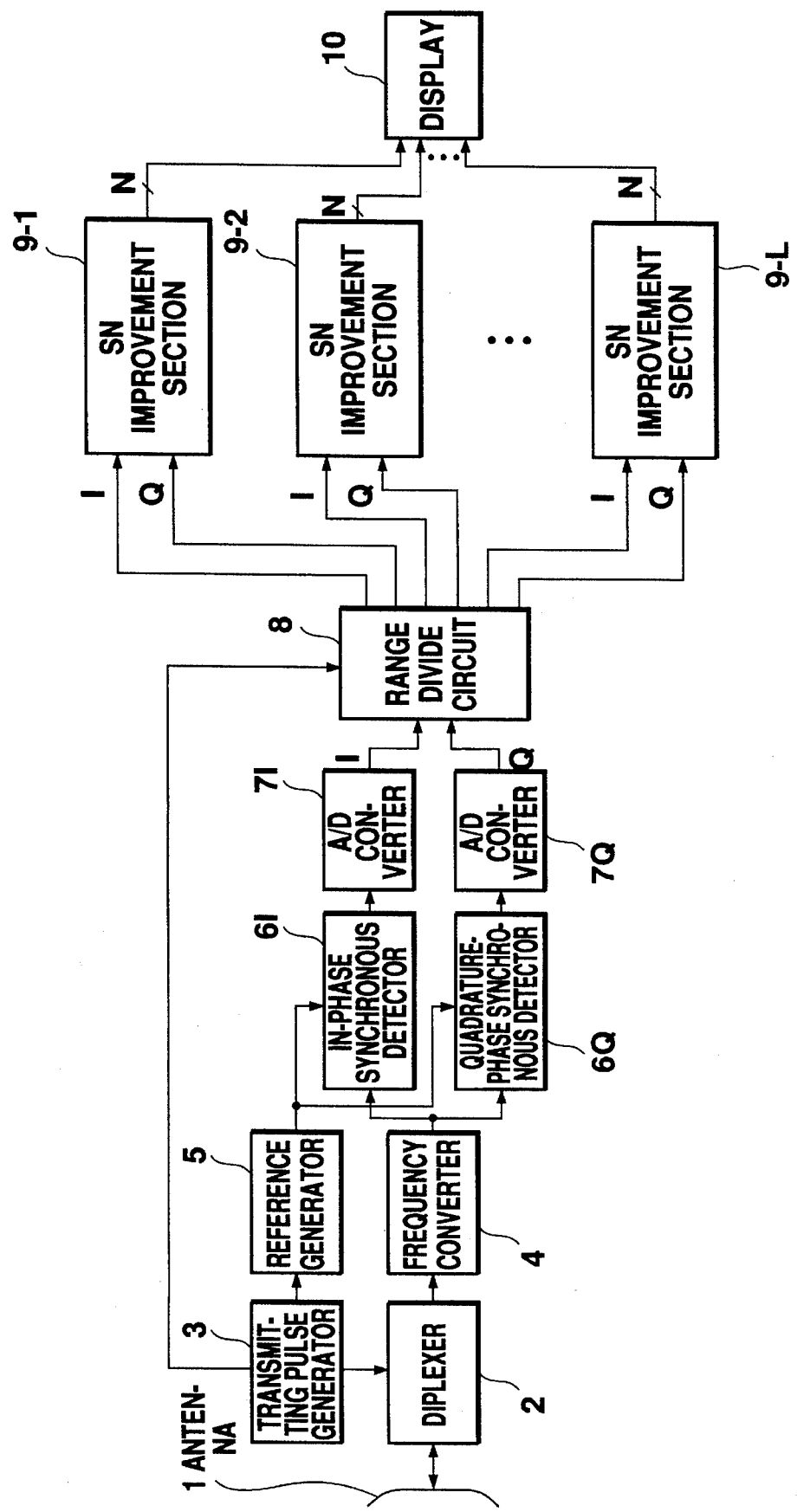
FIG. 11 is a block diagram showing the configuration of a conventional radar system.
Figure 12:
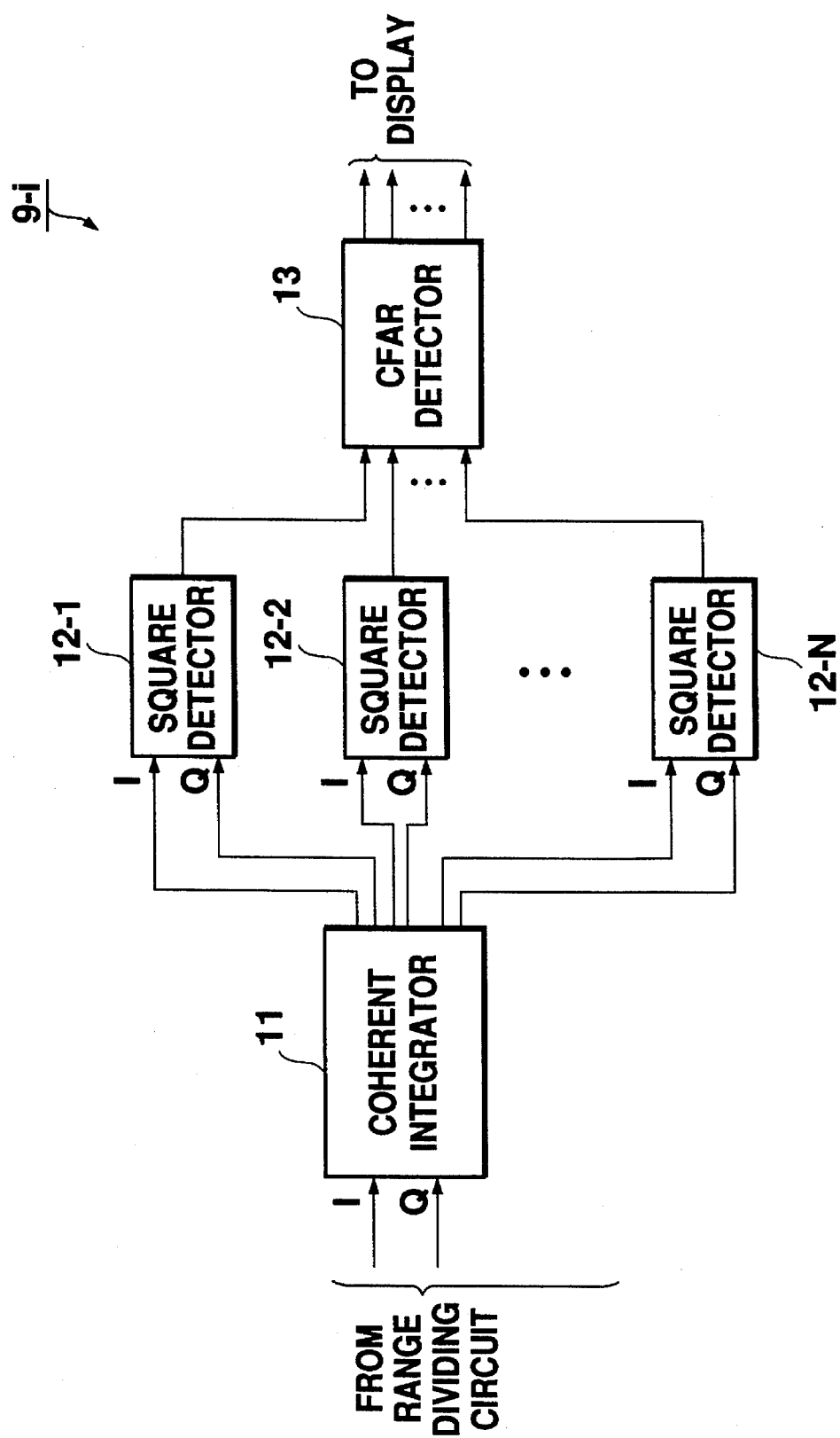
FIG. 12 is a block diagram showing the configuration of a main section of the conventional radar system in FIG. 11.

Members identical with or similar to those previously described with reference to FIGS. 11 and 12 are denoted by the same reference numerals in FIGS. 1–3, 6, and 8–10 and will not be discussed again. Members common to the embodiments described below are also denoted by the same reference numerals and will not be discussed again.

a) Principle

The principle on which the invention is based is that the number of coherent integration points, N, for a near range target may be made small compared with that for a far range target if SN improvement for the near range target can be accomplished equal to that for the far range target. This means that even if the number of coherent integration points, N, for the near range target is set small compared with that for the far range target, SN improvement for the near range target can be provided equal to or greater than that for the far range target. This principle can be explained as follows:

According to a well known radar equation, the SN per echo pulse is proportional to the fourth power of maximum detection range Rmax. Further, as described in the Description of the Related Art, the SN after coherent integration is proportional to the number of echo pulses integrated. Therefore, assuming that the SN after coherent integration is represented as X, the following relation holds:

$$X = c \, N/Rmax^4 \quad (1)$$

where c is a proportion constant.

If the complex signal obtained by radar transmission and reception is divided according to the range as in the conventional example radar system shown in FIGS. 11 and 12, the relations shown in expression (1) hold for each range domain R(i). In the conventional example radar system, the number of coherent integration points, N, is set to the same value for any range domain R(i). In the invention, the complex signal is also divided according to the range as in the conventional example radar system. However, the number of coherent integration points, N, is set to a different value for each range domain R(i). As seen in expression (1), if X is equal, N must be made large if Rmax is large; N may be made small if Rmax is small. This is discussed more specifically.

For example, consider a range domain represented by one range Ra. The S/N provided by executing coherent integration for the range domain becomes a value represented in the following expression (2) according to expression (1):

$$Xa = c \, Na/Ra^4 \quad (2)$$

where Na is the number of coherent integration points.

Consider a range domain represented by another range Rb (Rb<Ra). The S/N provided by executing coherent integration for the range domain becomes a value represented in the following expression (3) according to expression (1):

$$Xb = c \, Nb/Rb^4 \quad (3)$$

where Nb is the number of coherent integration points.

In the conventional example radar system, the number of coherent integration points, N, is constant regardless of the range. Taking expressions (2) and (3) as an example, Na=Nb. Since $1/Ra^4 < 1/Rb^4$, Xa<Xb always holds. If the number of coherent integration points, N, is set so that Xa becomes a sufficiently large value, Xb also becomes a sufficiently large value. However, from another viewpoint, Xb may be too large, thus responsiveness may be insufficient.

In the invention, the number of coherent integration points, N, is changed in response to the range; the number N is made smaller for the nearer range domain. Taking expressions (2) and (3) as an example, Na>Nb is set. In this case, Xa=Xb holds under some condition. The necessary and sufficient condition for making Xa=Xb hold is $$Nb/Rb^4 = Na/Ra^4 \quad (4)$$

Therefore, for example, if Rb=Ra/4 and Na=1024, $Nb = Na/4^4 = Na/256 = 4$ may be set to set Xb=Xa. In the invention, this principle is used to provide responsiveness to near range targets, etc. Improvement in responsiveness is also an advantageous condition in detection of high-speed moving targets.

The number of coherent integration points, Nb, where Xb=Xa holds is remarkably small compared with the number of coherent integration points, N, in the conventional example radar system, thus Nb can be increased in the range of Na>Nb. This means that Nb can also be set to a value such that Na>Nb and that Xa<Xb. The condition under which Xa<Xb holds is $$Nb/Rb^4 > Na/Ra^4 \quad (5)$$

In the invention, this can be used to accomplish SN improvement for near ranges and moreover improvement in the detection capability of near range targets.

Collecting expressions (4) and (5), the condition for setting the number of coherent integration points in the invention is represented as follows:

$$Nb/Rb^4 \geq Na/Ra^4 \quad (6)$$

where Na>Nb b) First embodiment

Figure 1:
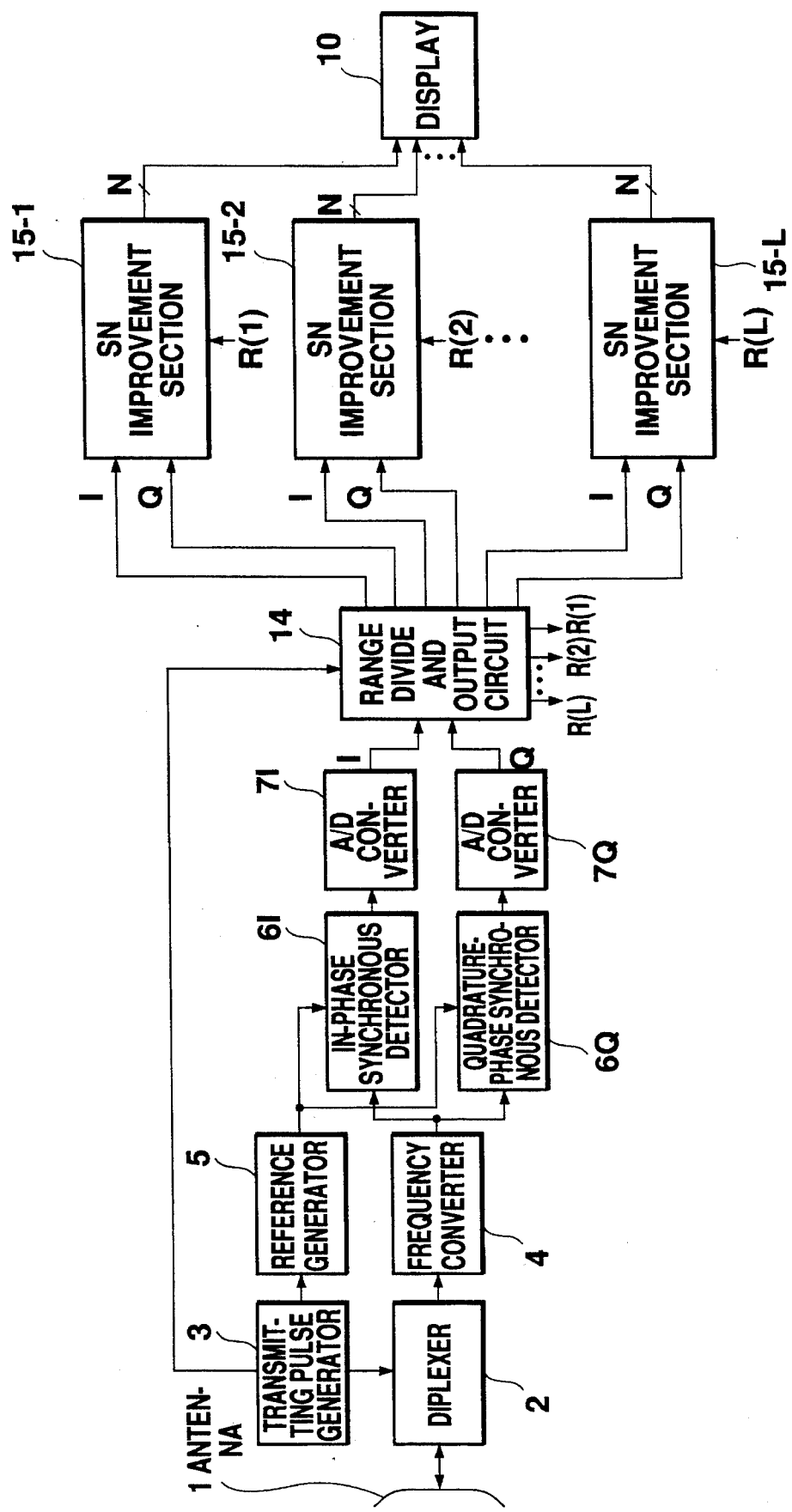
FIG. 1 is a block diagram showing the configuration of a first embodiment of the invention.

FIG. 1 shows the configuration of a first embodiment of the invention. In the embodiment, a range divide and output circuit 14 and SN improvement sections 15-i are provided in place of the range divide circuit 8 and the SN improvement sections 9-i in the conventional example (i: 1, 2, ... L, L: A natural number of 2 or greater, for example, 100).

The range divide and output circuit 14 supplies the part of the complex signal supplied from A/D converters 7I and 7Q corresponding to a range domain R(1) to an SN improvement section 15-1, the part corresponding to a range domain R(2) to an SN improvement section 15-2, ... the part corresponding to a range domain R(L) to an SN improvement section 15-L. That is, the range divide and output circuit 14 has a range divide function.

The range divide and output circuit 14 further has a range output function. That is, the range divide and output circuit 14 supplies information indicating the range domain R(1) to the SN improvement section 15-1, information indicating the range domain R(2) to the SN improvement section 15-2, ... information indicating the range domain R(L) to the SN improvement section 15-L. For example, assuming that the range domain to which the maximum detection range belongs is R(1), the range divide and output circuit 14 supplies information indicating the maximum detection range to the SN improvement section 15-1 which takes the range domain R(1). For example, assuming that the range domain to which the range of a half of the maximum detection range belongs is R(L/2), the range divide and output circuit 14 supplies information indicating a half of the maximum detection range to the SN improvement section 15-(L/2) which takes the range domain R(L/2). The information supplied from the range divide and output circuit 14 to each of the SN improvement sections 15-1 may be the range domain R(i) itself or the ratio of the range domain R(i) to the maximum detection range.

Figure 2:
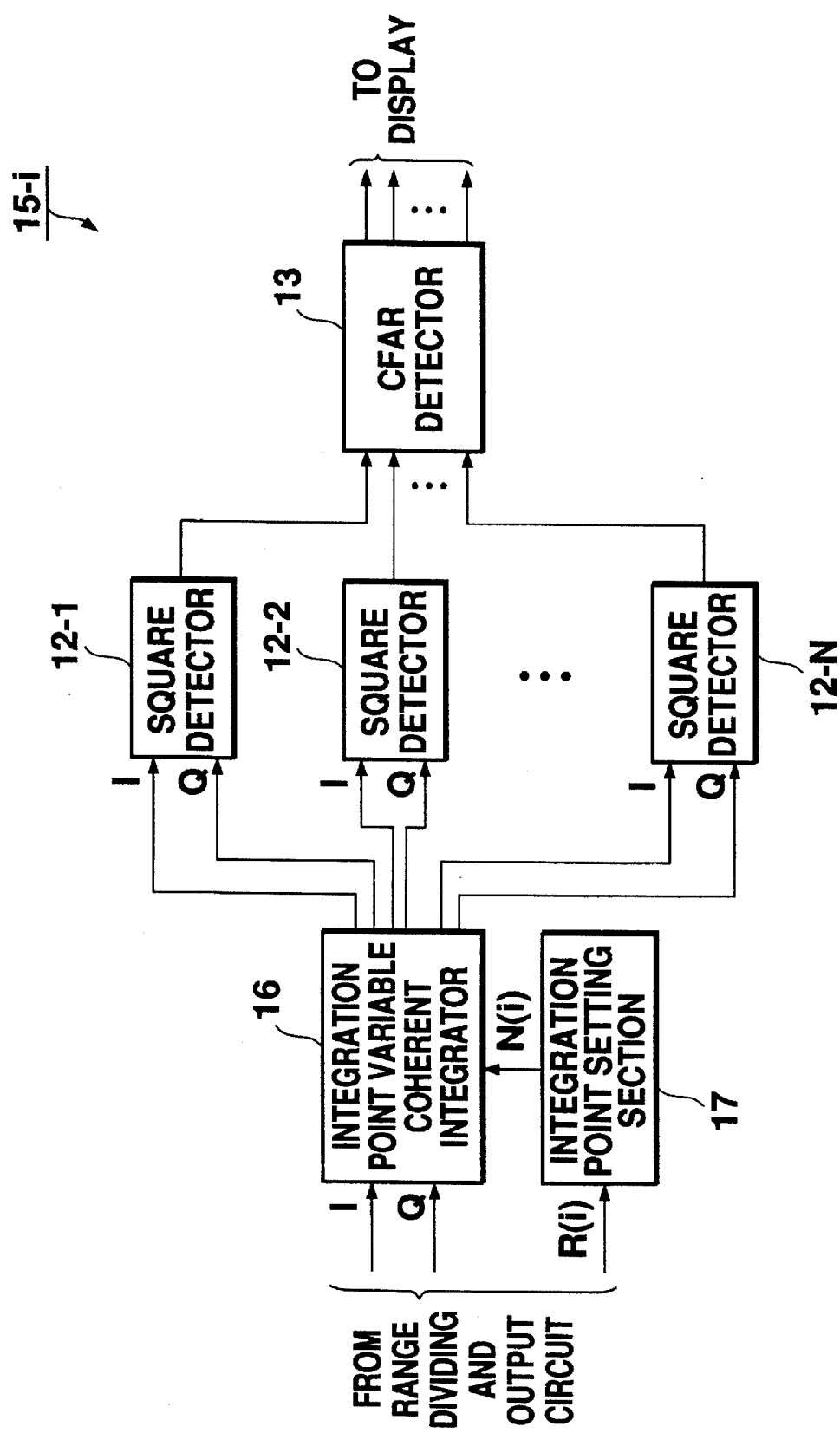
FIG. 2 is a block diagram showing the configuration of a main section of the first embodiment in FIG. 1.

The SN improvement section 15-1 has a configuration as shown in FIG. 2. The SN improvement section 15-1 shown here uses an integration point variable coherent integrator 16 in place of the coherent integrator 11 in the SN improvement section 9-1 in the conventional example. In addition, it comprises an integration point setting section 17.

The integration point setting section 17 sets the number of coherent integration points, N(i), in the integration point variable coherent integrator 16 in response to the information indicating the range domain R(i) supplied from the range divide and output circuit 14. For example, assuming that the range representing the range domain R(1) is the maximum detection range, the integration point setting section 17 in the SN improvement section 15-1 sets the number of coherent integration points N(1) as the value corresponding to the maximum detection range in the corresponding integration point variable coherent integrator 16. For example, assuming that a half of the maximum detection range represents the range domain R(L/2), the integration point setting section 17 in the SN improvement section 15-(L/2) sets the number of coherent integration points N(L/2) as the value corresponding to the half of the maximum detection range or greater in the corresponding integration point variable coherent integrator 16. If the number of coherent integration points corresponding to the maximum detection range is 1024, the number of coherent integration points corresponding to the half of the maximum detection range is $1024/2^4=64$.

Each integration point variable coherent integrator 16 coherently integrates as many echo pulses as the setup number of coherent integration points, N(i). The result is discriminated to N(1) Doppler frequency components and output to any of square detectors 12-1, 12-2, ... 12-N (N: A natural number of N(i) or greater) in the form of a complex signal. Here, assume that the maximum detection range represents the range domain R(1) and that a half of the maximum detection range represents the range domain R(L/2), as described above. Also, assume that the number of coherent integration points corresponding to the maximum detection range is 1024. In this case, to provide the same detection capability, namely, SN improvement performance in the range domains R(1) and R(L/2), the time taken for coherent integration in the integration point variable coherent integrator 16 in the SN improvement section 15-(L/2) may be $64/1024=1/16$ of the time taken for coherent integration in the integration point variable coherent integrator 16 in the SN improvement section 15-1. Of course, the number of coherent integration points can also be set to a value exceeding 64, in which case the time taken for the coherent integration becomes longer than 1/16, but the SN is improved higher than that in the range domain R(1).

Therefore, according to the embodiment, for near range targets, the time required for the coherent integration and moreover the observation time can be shortened without impairing the SN improvement or the detection capability or while furthermore improving it. This means that compared with the conventional systems, the system according to the embodiment can deal rapidly with near range targets and fast moving targets for which prompt steps should be taken, namely, responsiveness is improved.

b) Second embodiment

Figure 3:
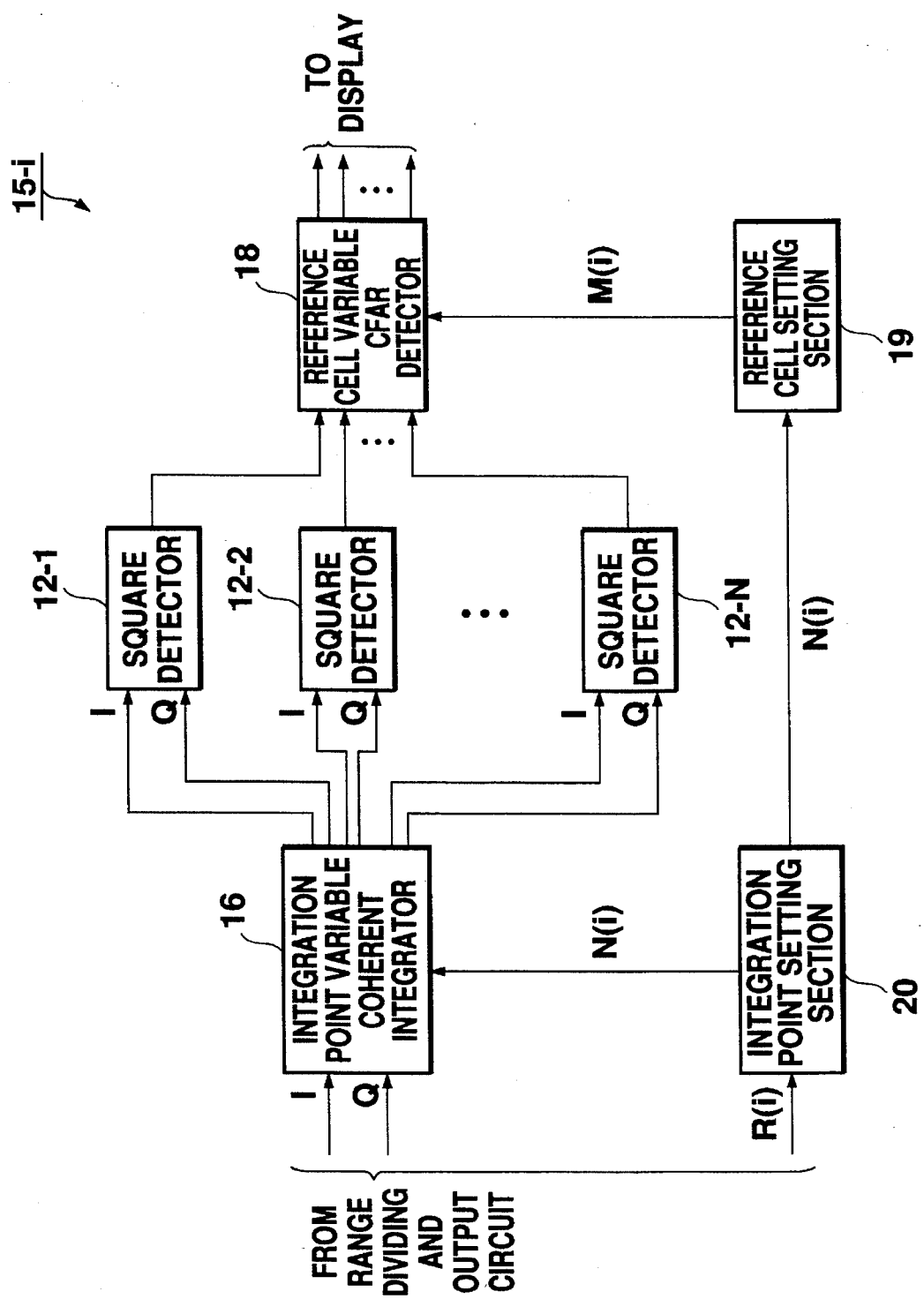
FIG. 3 is a block diagram showing the configuration of a main section of a second embodiment of the invention.

FIG. 3 shows the configuration of an SN improvement section 15-i according to a second embodiment of the invention. In the second embodiment, a reference cell variable CFAR detector 18 is provided in place of the CFAR detector 13 in the first embodiment. Further, a reference cell setting section 19 is newly located accompanying the reference cell variable CFAR detector 18. In addition, a coherence integration point setting section 20 is provided in place of the coherent integration point setting section 17.

The reference cell variable CFAR detector 18 has not only a CFAR processing function similar to that of the CFAR detector 13, but also a function by which the number of reference cells in CFAR processing can be set or changed externally. The reference cells mentioned here refer to the reference Doppler frequency components before and after an object Doppler frequency component. The reference cell setting section 19 in the SN improvement section 15-i sets the number of reference cells in the corresponding reference cell variable CFAR detector 18 in response to the number of coherent integration points, N(i). The coherent integration point setting section 20 in the SN improvement section 15-i supplies information indicating the number of coherent integration points N(i) to the corresponding reference cell setting section 19.

Figure 4:
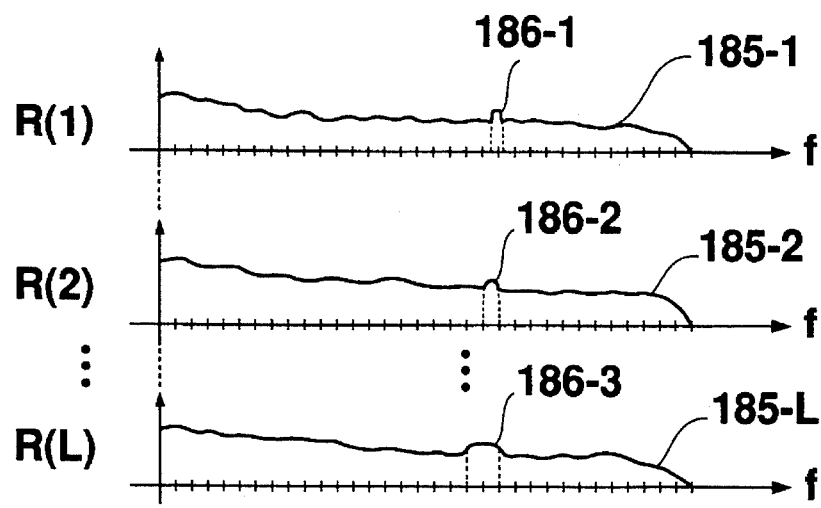
FIG. 4 is a drawing showing the effect provided by changing the number of coherent integration points.

If the number of coherent integration points, N(i), is set to a different value for each SN improvement section 15-i, as shown in FIG. 4, the greater the number of coherent integration points, N(i), (the upper plot in the figure), the greater the number of frequency components that can be used as reference Doppler frequency components for performing CFAR processing. The frequency axis can be finely subdivided and average value or weighted average value calculation to find the CFAR threshold can be performed with more reference Doppler frequency components. If the number of reference cells is increased, the threshold is made more accurate, resulting in improvement in the detection capability. In the embodiment, which depends on such a principle, the number of reference cells is changed in response to the number of coherent integration points, N(i), particularly for enhancing the detection capability of far range targets.

Figure 5:
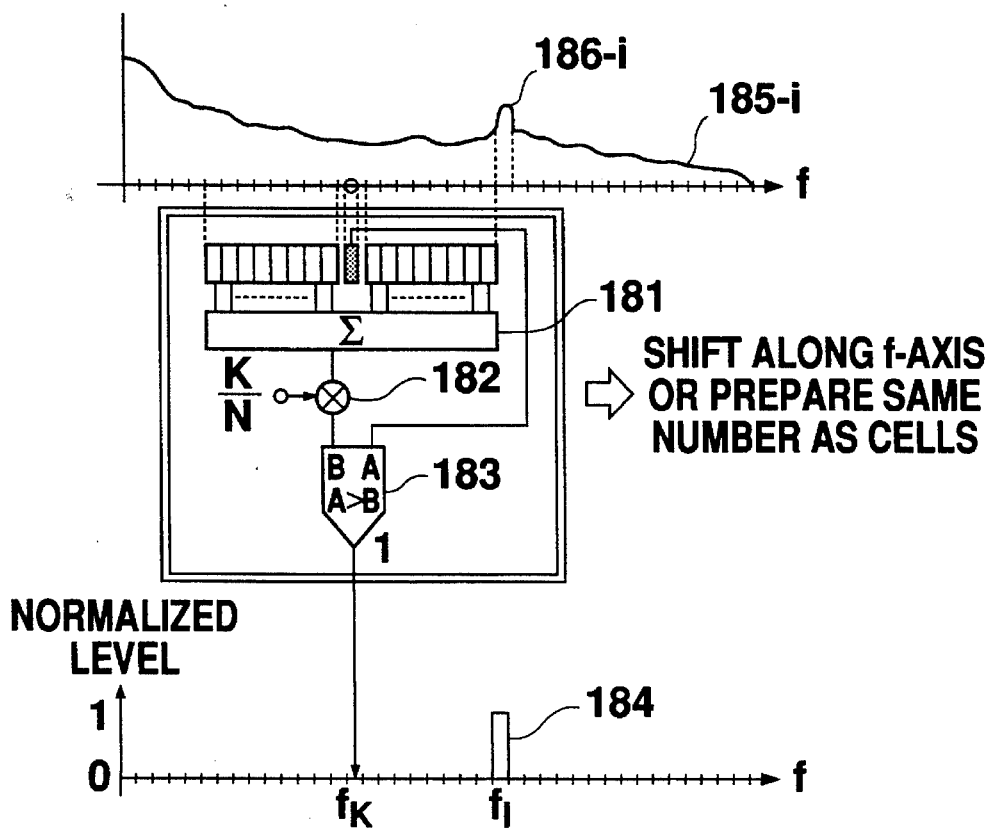
FIG. 5 is a drawing showing the function of a reference cell variable CFAR detector.

The reference cell variable CFAR detector 18 executes processing as shown in FIG. 5 for each Doppler frequency component. The sum of an object Doppler frequency fk component of a square detection value and M reference Doppler frequency components before and after, is calculated (181), the result is multiplied by a predetermined coefficient K/N to find a threshold (182), and the found threshold is compared with the object Doppler frequency fk component of the square detection value (183). If the former is larger than the latter as a result of the comparison, 0 is output; if the latter is larger than the former, 1 is output. Such CFAR processing is carried out for a necessary group of Doppler frequency components by providing as many CFAR processing functions, each consisting of functions 181–183, as there are reference cells or by using a single CFAR processing function and shifting it sequentially in the Doppler frequency axis direction. Therefore, a target signal 184 normalized to amplitude 1 is provided from the CFAR processing function where the Doppler frequency fI indicating the target signal speed is the object Doppler frequency or from the single CFAR processing function at a point in time when the Doppler frequency fI has become the object Doppler frequency as a result of shifting the CFAR processing function.

d) Third embodiment

Figure 6:
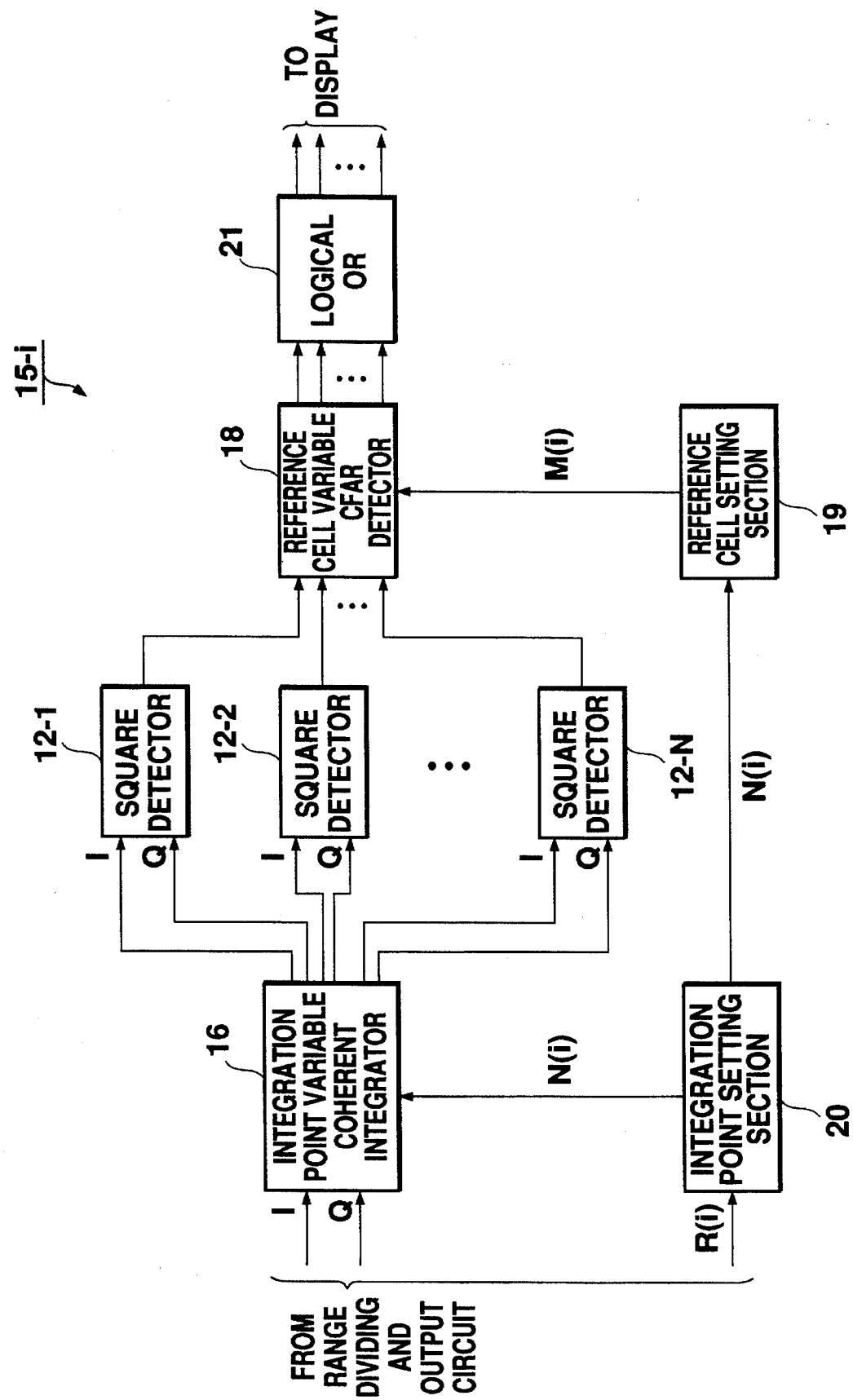
FIG. 6 is a block diagram showing the configuration of a main section of a third embodiment of the invention.

FIG. 6 shows the configuration of an SN improvement section 15-i according to a third embodiment of the invention. The third embodiment uses the fact that the number of coherent integration points, N(i), for a near range is comparatively small and therefore that the time taken for coherent integration is comparatively short. For a near range with a small number of coherent integration points, N(i), the surplus time produced by shortening the time taken for the coherent integration can be allocated to other processing such as search and definition. In the embodiment, a part of the surplus time is allocated to processing for improving the detection rate. The detection rate improvement processing is executed after CFAR detection is made.

In the embodiment, a logical OR circuit 21 is furthermore provided at the following stage of the reference cell variable CFAR detector 18 in the second embodiment for the detection rate improvement processing. However, if the OR circuit 21 is provided at the following stage of the CFAR detector 13 in the first embodiment, the merit of the OR circuit can also be enjoyed as in the third embodiment.

The OR circuit 21 stores outputs of the reference cell variable CFAR detector 18 over a predetermined number of observation points in time for each Doppler frequency component discriminated. The OR circuit 21 ORs the stored CFAR detection results and the CFAR detection result supplied from the reference cell variable CFAR detection circuit 18 at the current observation point in time for each Doppler frequency component, and outputs the result to a display 10. Thus, if a significant value ("1") appears in at least the CFAR processing result at one point in time among the CFAR detection results over the predetermined number of past observation points in time from the present, "1" is supplied to the display 10.

Figure 7:
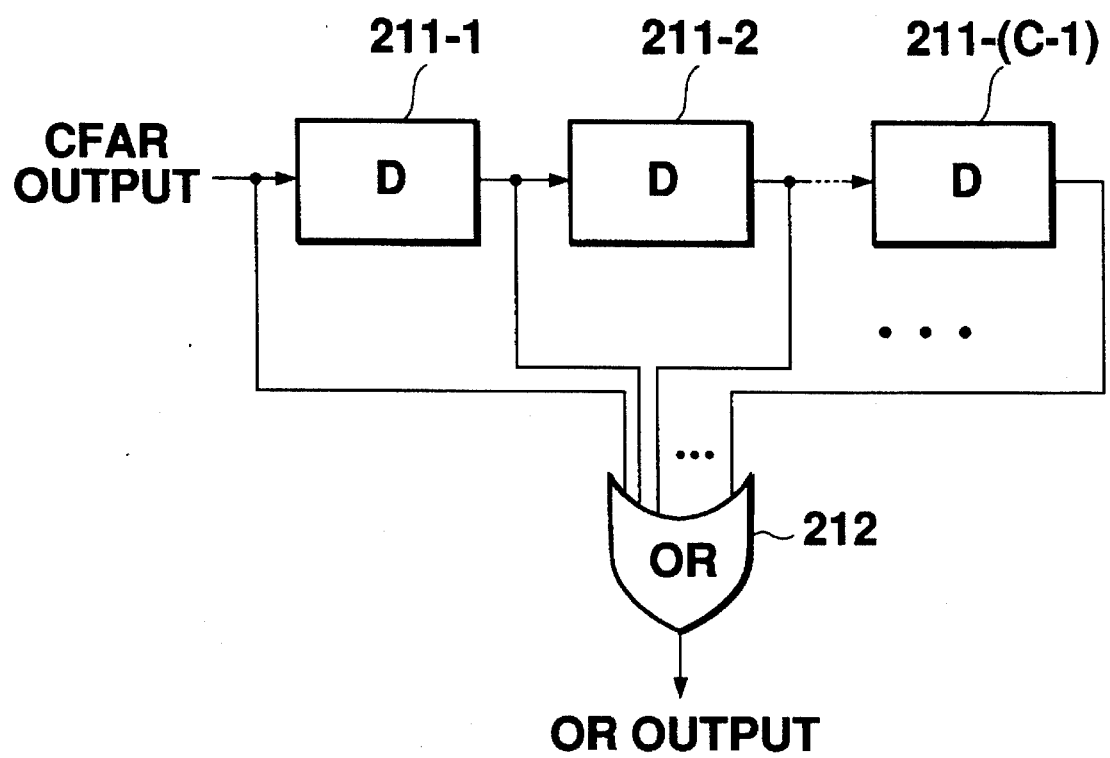
FIG. 7 is a block diagram showing the configuration of an OR circuit in the embodiment in FIG. 6.

Thus, the past CFAR processing results can be reflected in the output at the current point in time, so that the target detection rate is improved. Further, the longer the surplus time, namely, the nearer the range, the greater the number of observation points in time that can be stored in the OR circuit 21. Therefore, the effect of detection rate improvement increases in inverse proportion to the range. The OR circuit 21 may comprise as many delay circuits 211-1, 211-2, ... 211-(C-1) which are cascaded as "(the number of points in time to be ORed: A natural number of 2 or greater, which will be hereinafter referred to as the number of repetitions, C) −1=(number of points in time stored)" and supplies the CFAR processing result at the current point in time and outputs of the delay circuits to an OR gate 212, for example, as shown in FIG. 7. Alternatively, it may comprise a memory or register reset with the number of repetitions, C, as a period.

e) Fourth embodiment

Figure 8:
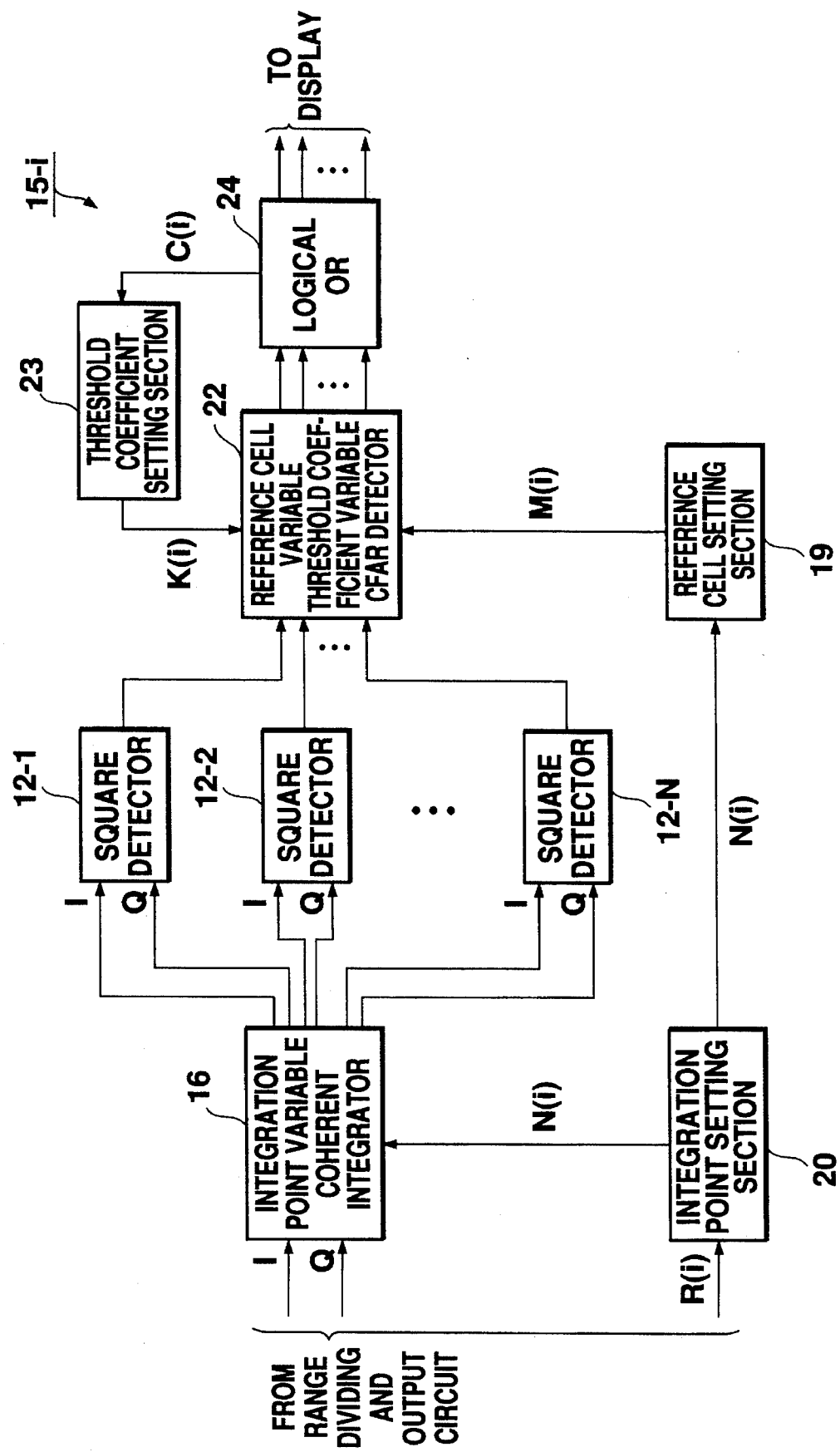
FIG. 8 is a block diagram showing the configuration of a main section of a fourth embodiment of the invention.

FIG. 8 shows the configuration of an SN improvement section 15-i according to a fourth embodiment of the invention. In the fourth embodiment, a reference cell and threshold coefficient variable CFAR detector 22 and a logical OR circuit 24 are provided in place of the reference cell variable CFAR detector 18 and the logical OR circuit 21 in the third embodiment. Further, a threshold coefficient setting section 23 is added.

The reference cell and threshold coefficient variable CFAR detector 22 is a CFAR detector where the number of cells and a threshold coefficient (K in FIG. 8) can be set or changed externally. The OR circuit has a function of outputting the number of repetitions, C, as well as a function of improving the detection rate as with the OR circuit 21 in the third embodiment. The number of repetitions, C, which is restricted by the number of coherent integration points, N(i), is a function of i and therefore is represented as C(i) in FIG. 8. The threshold coefficient setting section 23 determines a threshold coefficient K based on the number of repetitions, C(i), output from the OR circuit 24, and sets it in the reference cell and threshold coefficient variable CFAR detector 22. The threshold coefficient K, which is also a function of i, is represented as K(i) in FIG. 8. The threshold coefficient setting section 23 sets the threshold coefficient K based on the number of repetitions, C(i), for reducing the cumulative false alarm rate.

Here, assuming that the false alarm rate in the CFAR detection result at one observation point in time is represented as Pfa, the false alarm rate in output of the OR circuit 21 in the third embodiment becomes the value represented by the following expression (7), namely, cumulative false alarm rate Pcfa resulting from repeating accumulation the number of repetitions, C(i):

$$Pcfa = 1 - (1 - Pfa)^{C(i)} \qquad (7)$$

As understood from the expression (7), the cumulative false alarm rate Pcfa becomes high compared with the case where C(i)=1, namely, the OR circuit 21 is not used. If the number of repetitions, C(i), increases, the cumulative false alarm rate becomes increasingly high.

In the embodiment, setting the threshold coefficient K based on the number of repetitions, C(i), prevents accumulation from raising the false alarm rate. That is, since the cumulative false alarm rate Pcfa is determined by the false alarm rate Pfa and the number of repetitions, C(i), according to expression (7), occurrence of the cumulative false alarm rate Pcfa associated with introduction of the number of repetitions, C(i), and a raise in the cumulative false alarm rate Pcfa as the number of repetitions, C(i), increases can be offset or reduced by lowering the false alarm rate Pfa in the CFAR detection result. The false alarm rate Pfa in the CFAR detection result can be changed by altering the threshold coefficient K(i) by which the average value or weighted average value is multiplied at CFAR detection. Therefore, the false alarm rate Pcfa in output of the OR circuit 24 can be made a small value by properly setting the threshold coefficient K(i).

Thus, the threshold coefficient setting section 23 finds control target of the false alarm rate, Pfao, according to expression (8) using the number of repetitions, C(i), transferred from the OR circuit 24 in addition to the false alarm rate Pcfa in the output of the OR circuit 24 when the threshold coefficient K is controlled to a certain state. Expression (8) can be obtained by transforming expression (7) to replace Pfa with Pfao. The threshold coefficient setting section 23 controls the threshold coefficient K so that the false alarm rate Pfa in the output of the reference cell and threshold coefficient variable CFAR detector 22 becomes the control target Pfao.

$$Pfao = 1 - (1 - Pcfa)^{1/C(i)} \qquad (8)$$

Although the reference cell and threshold coefficient variable CFAR detector 22 is used in the embodiment, the effect of lowering the cumulative false alarm rate can also be produced if a CFAR detector having no reference cell variable function is used.

f) Fifth embodiment

Figure 9:
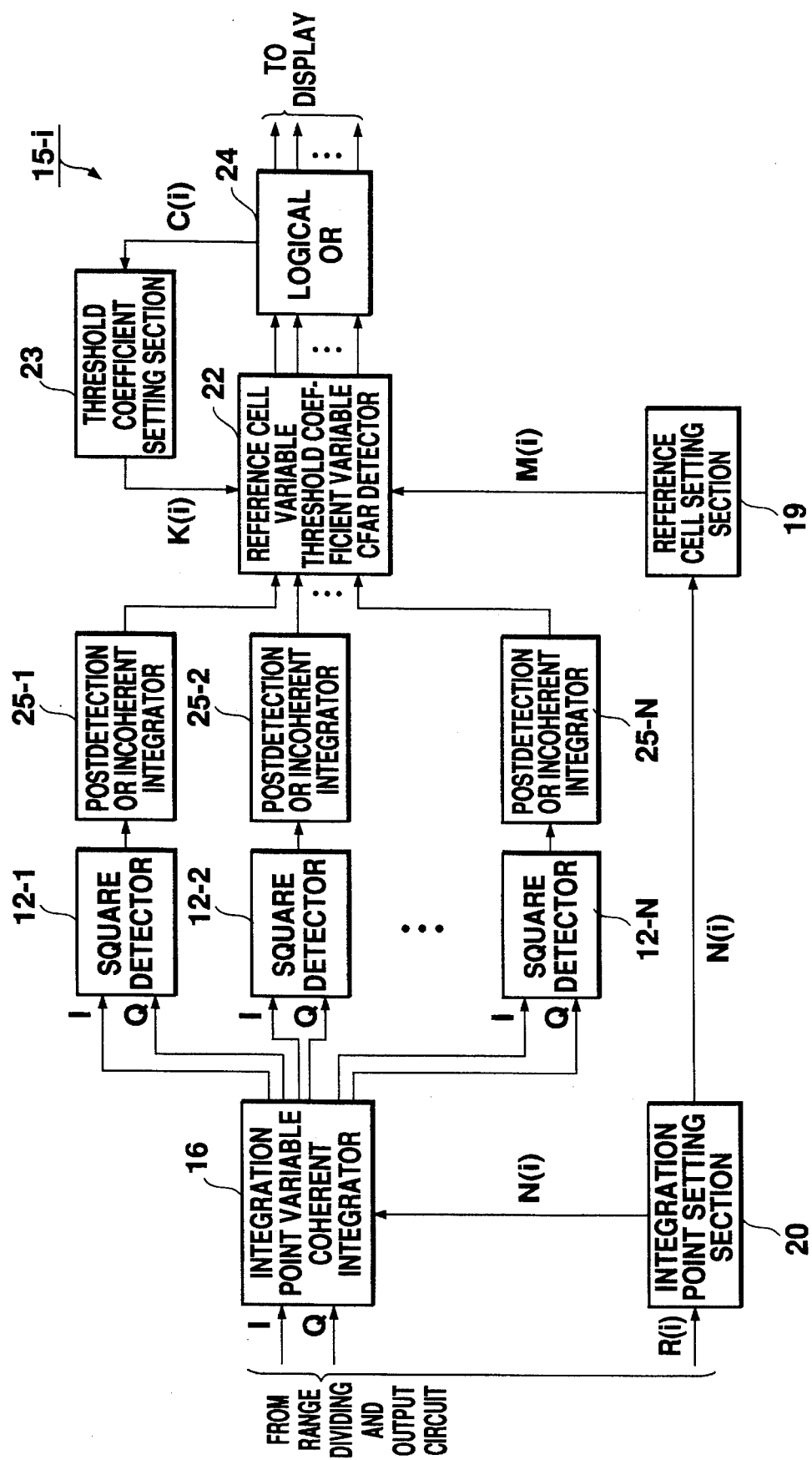
FIG. 9 is a block diagram showing the configuration of a main section of a fifth embodiment of the invention.

FIG. 9 shows the configuration of an SN improvement section 15-1 according to a fifth embodiment of the invention. In the fifth embodiment, a postdetection or incoherent integrator 25-i is provided at the following stage of the square detector 12-i in the fourth embodiment. The postdetection or incoherent integrator 25-i adds outputs of the corresponding square detector 12-i over a predetermined number of observation points in time, and supplies the result to a reference cell and threshold coefficient variable CFAR detector 22.

Thus, in the embodiment, postdetection integration is executed for furthermore improving the SN. In addition, the number of points in time for addition by the postdetection or incoherent integrator 25-i and the number of points in time for accumulation by a logical OR circuit 24 (the number of repetitions, C(i)) can be properly set within the allowable range of the surplus time described above. Therefore, when these numbers of points in time are set and the corresponding circuit is designed, flexible design is enabled.

Although the reference cell and threshold coefficient variable CFAR detector 22 is used in the embodiment, a CFAR detector having no reference cell variable function or threshold coefficient variable function may be used.

g) Sixth embodiment

FIG. 10 shows the configuration of an SN improvement section 15-i according to a sixth embodiment of the invention. In the sixth embodiment, a point variable FFT (fast Fourier transform) circuit 26 and an FFT point setting section 27 are provided in place of the integration point variable coherent integrator 16 and the integration point setting section 20. The point variable FFT circuit 26 is means for executing coherent integration and the number of FFT points can be set externally. The FFT point setting section 27 sets the number of FFT points in response to information indicating a range domain R(i). Further, since the number of FFT points must be a power of 2, if the number of FFT points, N(i), equivalent to the number of coherent integration points is specified by the FFT point setting section 27, in fact the number of FFT points in the point variable FFT circuit 26 becomes 2 raised to the minimum power greater than N(i).

Thus, the point variable FFT circuit 26 and the FFT point setting section 27 can be used as alternative means to the integration point variable coherent integrator 16 and the integration point setting section 20. The point variable FFT circuit 26 and the FFT point setting section 27 can be used in combination with any of the embodiments described above.

What is claimed is:

1. A radar signal processor for use in a pulse radar system, comprising:

a plurality of means for improving a signal to noise ratio by integration, each having predetection integration means for integrating reception signals over a number of integration points prior to detection of reception signals and generating an integrated reception signal, a different range being allocated to each of said plurality of signal to noise ratio improvement means;

range division means for dividing an input reception signal on the basis of a range from a transmission point, said range division means distributing the divided reception signal to the predetection integration means belonging to the corresponding signal to noise ratio improvement means in response to the range allocated to each of said plurality of signal to noise ratio improvement means; and integration point setting means for determining and setting the number of integration points for each of the plurality of signal to noise ratio improvement means, the number of integration points being set different for each of the predetection integration means so that the signal to noise ratio improved by any one of the plurality of signal to noise ratio improvement means is more than a predetermined degree and is equal to or higher than that improved by other ones of the plurality of signal to noise ratio improvement means allocated to farther ranges.

2. The radar signal processor as claimed in claim 1 wherein each of said predetection integration means has means for discriminating the integrated reception signal to a plurality of frequency components, and each of said plurality of signal to noise ratio improvement means further includes:

a) a plurality of detection means for inputting and detecting a corresponding one of said plurality of frequency components from the discriminating means of the predetection integration means belonging to the same signal to noise ratio improvement means; and b) a false alarm rate fixing means responsive to the detected frequency components for generating a detection signal representing existence and speed of a target from which signal a constant false alarm rate can be expected, said false alarm rate fixing means each having:

b1) means for finding an average value or weighted average value of reference frequency components for each object frequency component, the object frequency component referring to each of the detected frequency components and the reference frequency components referring to a predetermined number of frequency components preceding and following the object frequency component along a frequency axis;

b2) means responsive to the found average value or weighted average value for setting a threshold for said object frequency component; and b3) means for comparing the threshold set for each object frequency component with the corresponding object frequency component and totaling results for generating said detection signal.

3. The radar signal processor as claimed in claim 2 wherein each of the plurality of signal to noise ratio improvement means further includes:

c) means for setting the number of reference frequency components used as a basis to find said average value or weighted average value so that the greater the number of integration points set in the predetection integration means belonging to the same signal to noise ratio improvement means, the greater the number of reference frequency components.

4. The radar signal processor as claimed in claim 2 wherein each of the plurality of signal to noise ratio improvement means further includes:

d) logical operation means for performing a logical operation on a predetermined number of detection signals generated by the false alarm rate fixing means belonging to the same signal to noise ratio improvement means for totaling the detection signals and outputting the resultant total detection signal instead of the detection signals.

5. The radar signal processor as claimed in claim 3 wherein each of the plurality of signal to noise ratio improvement means further includes:

d) logical operation means for performing a logical operation on a predetermined number of detection signals generated by the false alarm rate fixing means belonging to the same signal to noise ratio improvement means for totaling the detection signals and outputting the resultant total detection signal instead of the detection signals.

6. The radar signal processor as claimed in claim 4 wherein each of the plurality of signal to noise ratio improvement means further includes:

e) means responsive to the number of detection signals totaled in the logical operation means belonging to the same signal to noise ratio improvement means for adjusting a threshold set by the false alarm rate fixing means belonging to the same signal to noise ratio improvement means so that a false alarm rate of the total detection signal output from said logical operation means is suppressed.

7. The radar signal processor as claimed in claim 5 wherein each of the plurality of signal to noise ratio improvement means further includes:

e) means responsive to the number of detection signals totaled in the logical operation means belonging to the same signal to noise ratio improvement means for adjusting a threshold set by the false alarm rate fixing means belonging to the same signal to noise ratio improvement means so that a false alarm rate of the total detection signal output from said logical operation means is suppressed.

8. The radar signal processor as claimed in claim 2 wherein each signal to noise ratio improvement means further includes:

f) a plurality of postdetection integration means each for inputting detected frequency components from a corresponding one of said detection means belonging to the same signal to noise ratio improvement means, integrating a predetermined number of the frequency components, and supplying an integration result to said false alarm rate fixing means belonging to the same signal to noise ratio improvement means.

9. The radar signal processor as claimed in claim 6 wherein each signal to noise ratio improvement means further includes:

f) a plurality of postdetection integration means each for inputting detected frequency components from a corresponding one of said detection means belonging to the same signal to noise ratio improvement means, integrating a predetermined number of the frequency components, and supplying an integration result to said false alarm rate fixing means belonging to the same signal to noise ratio improvement means.

10. The radar signal processor as claimed in claim 7 wherein each of the plurality of signal to noise ratio improvement means further includes:

f) a plurality of postdetection integration means each for inputting detected frequency components from a corresponding one of said detection means belonging to the same signal to noise ratio improvement means, integrating a predetermined number of the frequency components, and supplying an integration result to said false alarm rate fixing means belonging to the same signal to noise ratio improvement means.

11. In a pulse Doppler radar system, a method of improving a signal to noise ratio, comprising the steps of:

generating divided reception signals by dividing a reception signal on the basis of a range from a transmission point;

setting the number of integration points for each of the divided reception signals on the basis of the range, the number of integration points being set different for each of the divided reception signals so that when each of the divided reception signals are integrated prior to detection over the number of the integration points, the signal to noise ratio of each of the reception signals after the integration is more than a predetermined degree and is equal to or higher than that of other reception signals after the integration representing farther ranges; and executing predetection integration of the divided reception signal for each range over the number of integration points.

12. In a pulse Doppler radar system, a method of improving a detection capability, comprising the steps of:

generating divided reception signals by dividing a reception signal on the basis of a range from a transmission point;

setting the number of integration points for each of the divided reception signals on the basis of the range, the number of integration points being set different for each of the divided reception signals so that when each of the divided reception signals are integrated prior to detection over the number of the integration points, the signal to noise ratio of each of the reception signals after the integration is more than a predetermined degree and is equal to or higher than that of other reception signals after the integration representing farther ranges;

integrating the divided reception signal before detection for each range over the number of integration points;

discriminating the reception signal integrated before detection to a plurality of frequency components;

detecting the frequency components resulting from the discriminating;

defining each of the detected frequency components related to the same range, as an object frequency component and a predetermined number of frequency components related to the same range preceding and following the object frequency component along a frequency axis as reference frequency components and finding an average value or weighted average value of the reference frequency components for each object frequency component;

setting a threshold for the object frequency component based on the found average value or weighted average value;

comparing the threshold set for each object frequency component with the corresponding object frequency component and totaling results for generating a detection signal representing existence and speed of a target from which signal a constant false alarm rate can be expected; and setting the number of reference frequency components used as a basis to find said average value or weighted average value so that tile greater the number of integration points related to the same range, the greater the number of reference frequency components.

13. The method as claimed in claim 12 further including the step of:

performing a logical operation on a predetermined number of detection signals related to the same range for totaling the detection signals and outputting the resultant total detection signal instead of the detection signals.

14. The method as claimed in claim 13 further including the step of:

being responsive to the number of detection signals totaled in logical operations related to the same range for adjusting a threshold related to the same range so that a false alarm rate of the total detection signal is suppressed.

15. The method as claimed in claim 12 further including the step of:

inputting detected frequency components related to the same range, integrating a predetermined number of the frequency components, and supplying an integration result to false alarm rate fixing process related to the same range.

* * * * *